United States Patent [19]
Helton

[11] Patent Number: 5,478,190
[45] Date of Patent: Dec. 26, 1995

[54] ROLL-OFF TRAILER WITH CARGO CONTROLLING MECHANISM

[76] Inventor: Jesse D. Helton, Box 361, Crocker, Mo. 65452

[21] Appl. No.: 213,669

[22] Filed: Mar. 15, 1994

[51] Int. Cl.⁶ ................................................. B60P 1/52
[52] U.S. Cl. ........................................ 414/530; 193/35 A
[58] Field of Search ................................ 414/529, 530, 414/536; 193/35 A

[56] References Cited

U.S. PATENT DOCUMENTS

| | | | |
|---|---|---|---|
| 468,559 | 2/1892 | Chatfield | 414/530 X |
| 1,509,530 | 9/1924 | Shirreff . | |
| 1,734,754 | 11/1929 | Thompson . | |
| 2,384,196 | 9/1945 | Rosen | 90/13.5 |
| 2,384,346 | 9/1945 | Schnell | 188/151 |
| 2,391,074 | 12/1945 | Schnell | 188/75 |
| 3,043,405 | 7/1962 | Sussebach | 188/151 |
| 3,062,333 | 11/1962 | Gorjanc | 188/152 |
| 3,068,966 | 12/1962 | Knapmeyer | 188/170 |
| 3,115,956 | 12/1963 | Trobmetta | 188/171 |
| 3,173,517 | 3/1965 | Powlas | 188/152 |
| 3,203,509 | 8/1965 | Bohn | 188/75 |
| 3,324,976 | 6/1967 | Tuegel | 188/170 |
| 3,430,738 | 3/1969 | Dain et al. | 188/75 |
| 3,435,969 | 4/1969 | McCartney et al. . | |
| 3,547,230 | 12/1970 | Shank | 188/75 |
| 3,606,059 | 9/1971 | Haberle, Jr. . | |
| 3,710,897 | 1/1973 | Moody | 188/75 |
| 3,744,594 | 7/1973 | Cashion | 188/76 |
| 3,789,960 | 2/1974 | Warren | 193/35 AX |
| 4,020,926 | 5/1977 | Slatter et al. | 188/75 |
| 4,020,959 | 5/1977 | Livesay | 193/35 AX |
| 4,116,308 | 9/1978 | Sever | 188/171 |
| 4,132,292 | 1/1979 | Dufresne | 188/171 |
| 4,348,150 | 9/1982 | Inghram et al. | 414/536 X |
| 4,488,638 | 12/1984 | Morgan et al. | 193/35 AX |
| 4,798,282 | 1/1989 | Sperduti et al. | 193/35 AX |
| 4,806,061 | 2/1989 | Fenton | 414/475 |
| 5,086,903 | 2/1992 | Agnoff | 193/35 A |
| 5,147,020 | 9/1992 | Scherman et al. | 193/35 A |
| 5,395,204 | 3/1995 | Balik | 414/529 X |

FOREIGN PATENT DOCUMENTS 516562 1/1940 United Kingdom .

Primary Examiner—Michael S. Huppert
Assistant Examiner—James W. Kennan
Attorney, Agent, or Firm—Herzog, Crebs & McGhee

[57] ABSTRACT

A roll-off trailer or truck bed for hauling cargo includes a cargo controlling mechanism that allows for the controllable removal of the cargo. The roll-off trailer characteristically includes a plurality of rotatable rollers disposed transverse to the longitudinal length of the trailer. The cargo controlling mechanism includes a brake mechanism preferably associated with at least several of the plurality of rollers. When actuated, the brake mechanism retards, stops, or nonrotatably restrains rotational movement of the rollers in order to slow down or stop the off-loading of the cargo. Actuation of the brake mechanisms may be accomplished through hydraulic, electric, pneumatic, mechanical, or other means. Each brake mechanism may be separately controlled by the operator in order to selectively retard the rotation of the desired roller. Alternatively, a number of brake mechanisms may be linked together to constitute a group. A control assembly regulates the brake mechanisms of the group. Furthermore, several groups may be separately controlled through the control assembly.

11 Claims, 4 Drawing Sheets

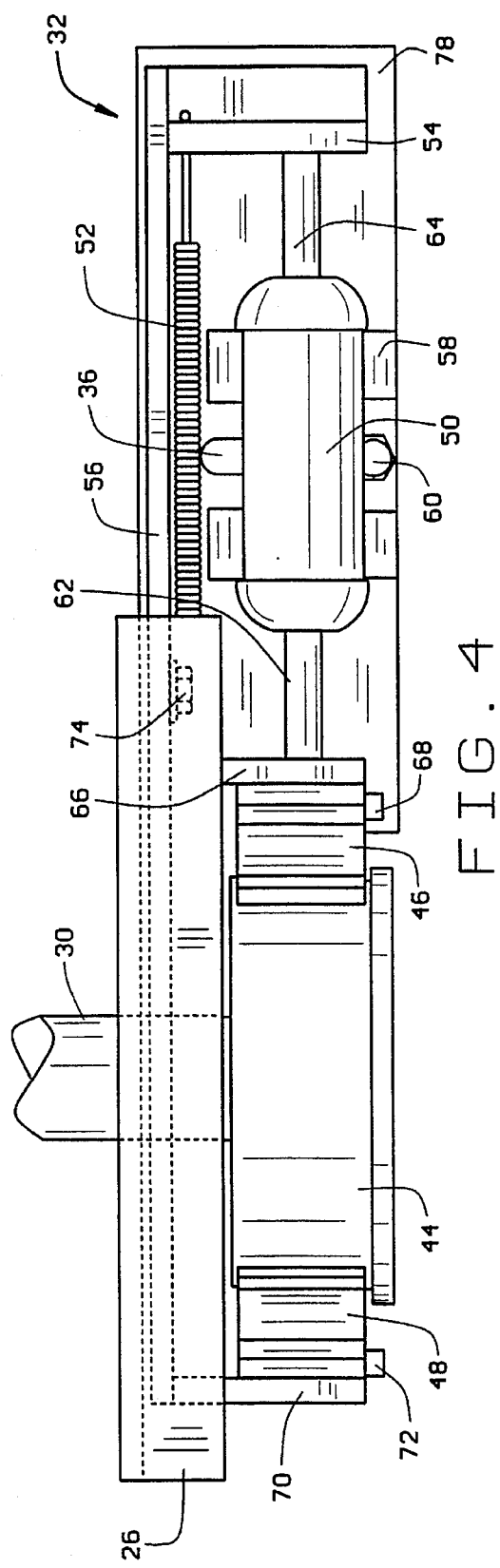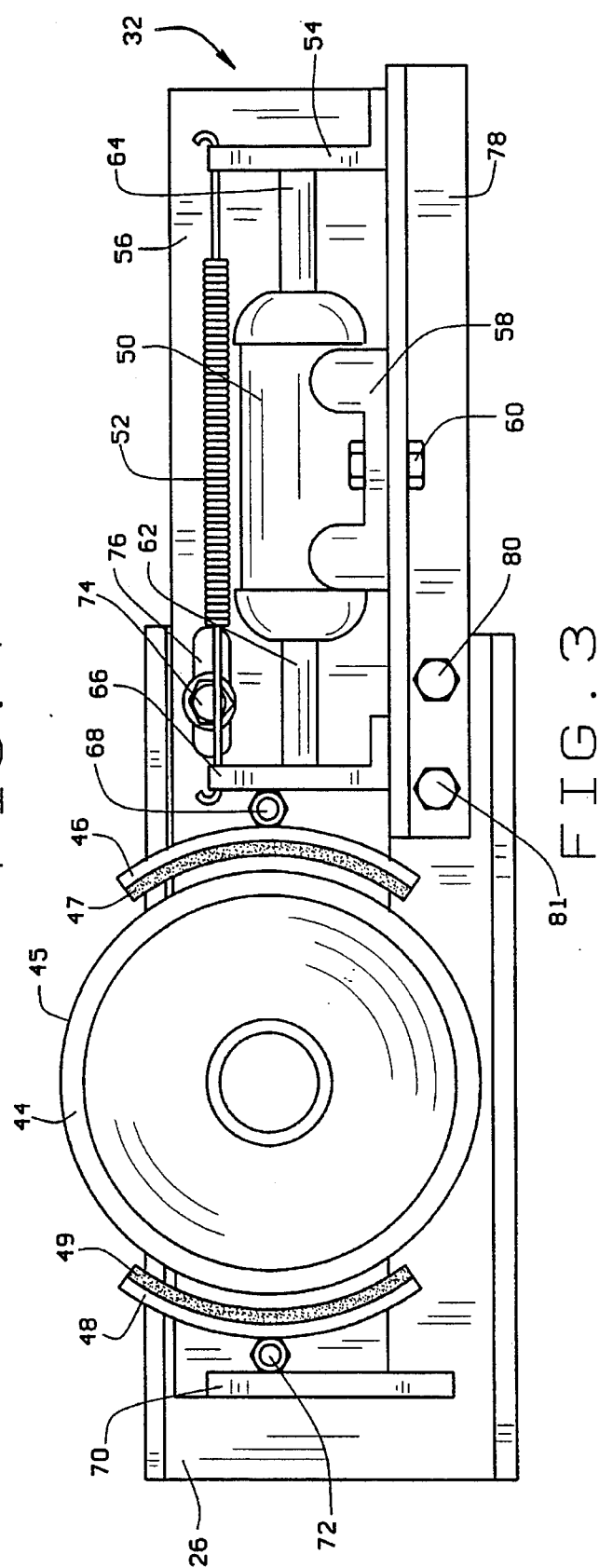

ROLL-OFF TRAILER WITH CARGO CONTROLLING MECHANISM

FIELD OF THE INVENTION

The present invention relates generally to transport trailers and, more particularly to transport trailers having a plurality of rollers for assisting in the unloading of the cargo carried thereon.

BACKGROUND OF THE INVENTION

The shipping of goods by truck necessarily includes the loading and unloading of the goods carried thereby. When transporting goods such as bundled building trusses to construction sites it has become common practice to haul the trusses via trucks that are attached to what are known as roll-off trailers.

Roll-off trailers are flatbed trailers that have a plurality of freewheeling rollers disposed along the longitudinal length thereof. The number of rollers varies according to the size of the rollers and the spacing along the trailer bed. Furthermore, there may be more than one row of rollers whose size and spacing may vary.

The use of roll-off trailers eliminates the need for special unloading equipment such as cranes or forklifts that may or may not be at the construction site at the time of delivery of the trusses. Roll-off trailers thus provide flexibility in delivering the trusses at any time.

However, in order to unload the bundled trusses, the truck driver has only several options. One method is to jerk the truck forward to hopefully cause the bundled trusses to roll down the freewheeling rollers and drop onto the ground. This subjects the bundled trusses to a drop of several feet at an uncontrollable speed depending on the suddenness of the jerk. Furthermore, not only do the trusses undergo stress due to the impact with the ground, the trusses bend as they make the transition from roll-off trailer to the ground. Because of this procedure the bundled trusses may become damaged and/or unusable.

Another method for unloading the bundled trusses is to incline the trailer and allow gravity to roll the bundled trusses off the end of the roll-off trailer. This may be accomplished by either driving the truck and roll-off trailer up a grade, or by raising the front end of the roll-off trailer through hydraulic rams or the like. Again, this subjects the bundled trusses to a drop of several feet.

In order to help alleviate the problems associated with the above two methods of unloading the cargo from the roll-off trailers, special tiltable rear ends have been devised. In order to have the bundled trusses roll directly from the roll-off trailer onto the ground without dropping them from a height the end of the roll-off trailer is tiltable. Generally, however, the tilting-bed roll-off trailers utilize a powered winch and cable to control the speed of the cargo. These systems however are not suitable for such cargo as bundled building trusses.

In most cases it is not possible to easily and efficiently control the speed of the trusses as they roll down the length of the roll-off trailer regardless of the unloading method used. Generally, the greater the speed of the trusses, the greater potential for damage to occur. The prior art is thus deficient in the ability to effectively control the unloading of bundled building trusses or other cargo transported by roll-off trailers.

It is thus an object of the present invention to provide a roll-off trailer wherein the speed of the cargo can be controlled during unloading thereof.

SUMMARY OF THE INVENTION

In accordance with the above object, the present invention is directed to a roll-off trailer having a cargo controlling mechanism.

Specifically, the roll-off trailer of the present invention includes a controllable brake mechanism that is coupled to at least one roller of the plurality of freewheeling rollers of the roll-off trailer. The brake mechanism is controllably actuated by the operator through a control unit in communication with the brake mechanism to retard rotational movement of the roller associated with the brake mechanism. This permits the operator to slow the speed of the cargo being off-loaded without a direct connection to the cargo. Additionally, the brake mechanism can stop or non-rotatably retain the rotational movement of the roller in order to prevent movement of the cargo.

In one form thereof, a plurality of brake mechanisms are coupled to a plurality of rollers of the roll-off trailer. Each brake mechanism may be separately controlled by the operator in order to selectively retard the rotation of the desired roller. Alternatively, a selected number of brake mechanisms may be linked together to constitute a group. A control assembly regulates all of the brake mechanisms of the particular group. Several groups may be separately controlled through the control assembly.

Actuation of the brake mechanisms may be accomplished by use of hydraulic, electric, pneumatic, chain and sprocket, or other means.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and is therefore not to be considered limiting of its scope, for the invention may admit to other equally effective embodiments. Reference the appended drawings, wherein:

FIG. 3 is an enlarged front view of a brake mechanism;

FIG. 4 is a top view of the brake mechanism of FIG. 3; and

DETAILED DESCRIPTION

Figure 1:
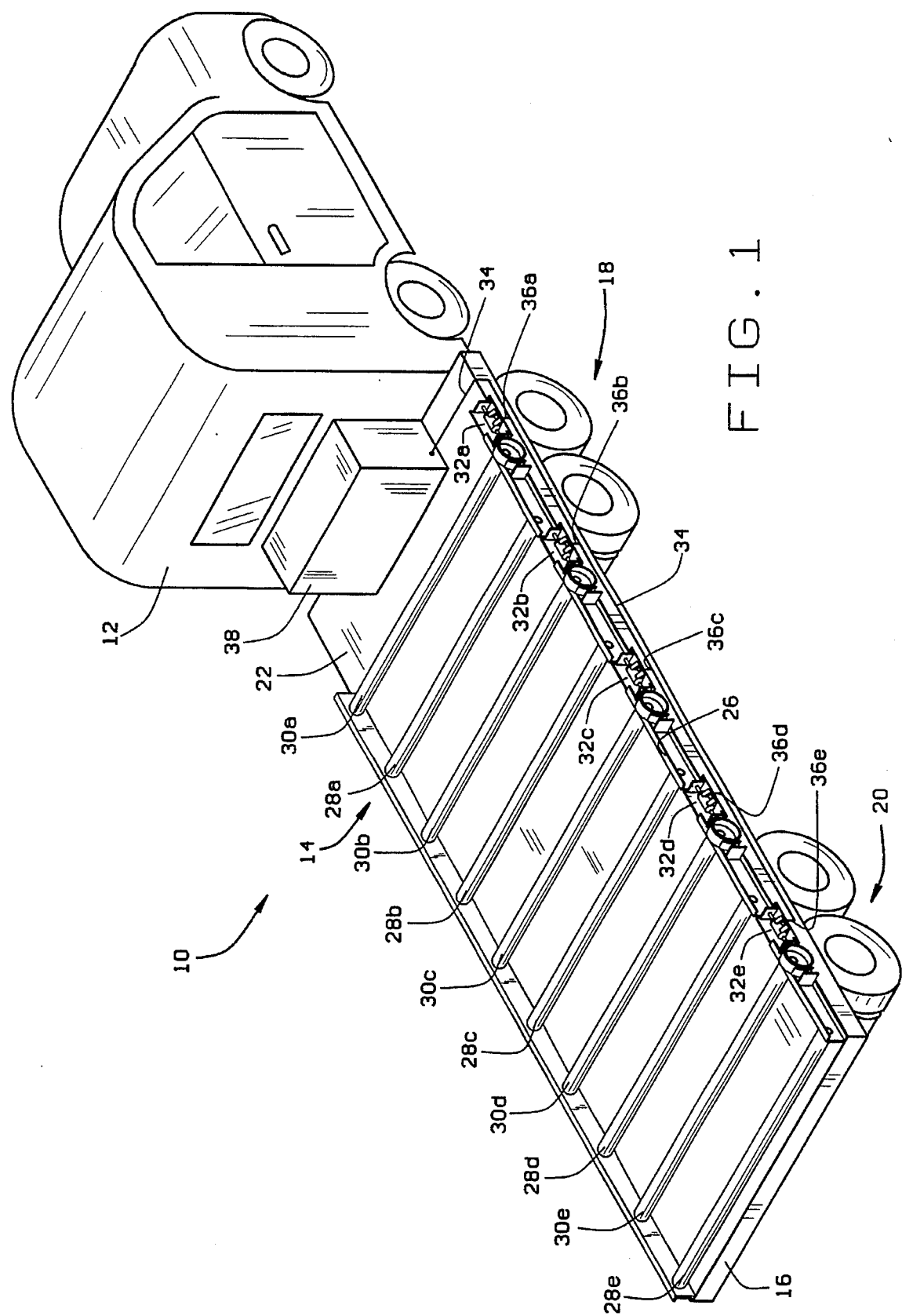
FIG. 1 is an elevational view of a roll-off trailer and truck cab, the roll-off trailer having the characteristic plurality of rotatable rollers with some of the rollers having brake mechanisms coupled thereto in accordance with the present invention.

Referring now to FIG. 1 there is shown a cargo transport truck generally designated 10. Transport truck 10 includes a typical truck cab 12 and a roll-off trailer 14. Roll-off trailer 14 is similar to typical flatbed trailers in that it includes an elongated bed 16 supported by front dual axles and associated wheels 18 and rear dual axles and associated wheels 20.

A first elongated rail 24 is disposed on the upper surface 22 along one elongated side of bed 16. A second elongated rail 26 is disposed on the upper surface 22 along the other elongated side of bed 16.

Interposed between rails 24 and 26 are a plurality of rollers 28a–e and 30a–e. Each roller 28a–e and 30a–e has an axis of rotation that is transverse to the longitudinal length of flatbed 16 such that the rollers revolve in the longitudinal direction. As depicted in FIG. 1, rollers 28a–e are freewheeling rollers, while rollers 30a–e are controlled rollers. The distinction between the freewheeling rollers 28a–e and the controlled rollers 30a–e is the connection of brake mechanisms 32a–e to rollers 30a–e, hence the term controlled rollers, while rollers 28a–e have no such brake mechanisms associated or coupled therewith, hence the term freewheeling rollers. The freewheeling rollers 28a–e are rotationally uninhibited on their axes and thus are freely rotatable in both the clockwise and counterclockwise directions. While the controlled rollers 30a–e are likewise generally freely rotatable in both the clockwise and counterclockwise directions, the brake mechanisms 32a–e coupled thereto permit a controlled retarding of the rotational velocity and hence function as a rotational speed controlling mechanism. Furthermore, the brake mechanisms 32a–e can prevent any rotation of the controlled rollers 30a–e. Thus, by controlling the rotation of the rollers, the unloading of the cargo can be controlled. This is due to the fact that movement of the cargo along the rollers is regulated by the rotation and rotational velocity of the rollers.

It should here be appreciated that the overall configuration and number of the freewheeling rollers 28a–e and the controlled rollers 30a–e along the bed 16 as depicted in FIG. 1 is not the only one contemplated. On the contrary, the overall configuration and number of freewheeling rollers and controlled rollers in FIG. 1 only illustrates the concepts of the present invention. In this regard, any number, configuration or pattern of freewheeling rollers and controlled rollers may be utilized. As an example, it is contemplated, as described below, that a number of controlled rollers constituting a group, be commonly coupled. The group of controlled rollers would be collectively actuated and thus act in unison. A number of adjacent controlled rollers would constitute a group, while a number of adjacent freewheeling rollers would follow, also constituting a group of freewheeling rollers. This pattern would progress the entire longitudinal length of the flatbed. Alternatively, there may be only one group of controlled rollers strategically placed on the flatbed with the remaining rollers of the freewheeling type. In yet another embodiment, all of the rollers may be controlled, either individually or in groups, as described above.

As is evident from the foregoing, the pattern or configuration of controlled rollers to freewheeling rollers may be dictated by cargo characteristics, preference, or by simple choice.

Still referring to FIG. 1, each brake mechanism 32a–e includes a connecting control line or cable 36a–e coupled thereto, each of which is in communication with a master control line or cable 34. Master control line 34 is positioned along side rail 26 and is in communication with a control unit or module 38. Control unit 38 is shown mounted on upper surface 22 of flatbed 16 adjacent truck cab 12. One should note that the placement of control unit 38 is generally arbitrary. Control unit 38 houses the components necessary to actuate the brake mechanisms 32a–e depending on the type of brake actuating mechanism utilized and the grouping or nongrouping of the controlled rollers. In the case of hydraulic actuators (50), control unit 38 includes hydraulic pumps and fluid supply, as well as valving, a controller and appropriate conduits to send the hydraulic fluid to the brake mechanisms. In the case of pneumatic actuators (50), control unit 38 includes a pressurized air supply, valving, and appropriate conduits and controls necessary to send the pressurized air to the desired brake mechanisms. In the case of electric actuators (50), control unit 38 includes the necessary electrical power providers, switching and appropriate controls to send an electrical signal to the desired brake mechanisms.

Figure 2:
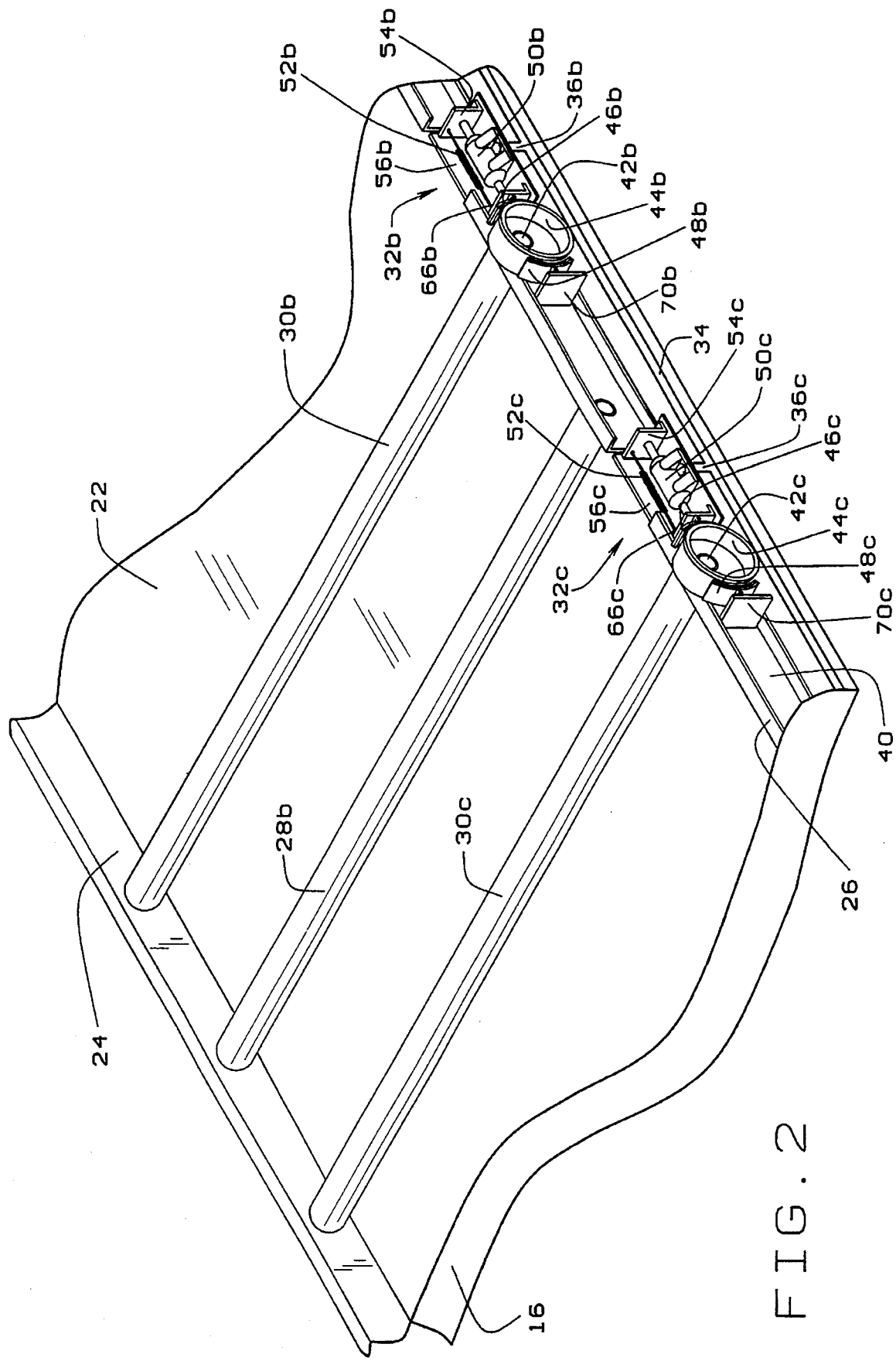
FIG. 2 is an enlarged elevational view of a portion of the roll-off trailer of FIG. 1 showing several rollers and associated brake mechanisms.

With reference to FIG. 2, a portion of the bed 16 of FIG. 1 is enlarged showing the coupling and mounting of two of the brake mechanisms 32b and 32c. Rail 26 defines a channel 40 in which the brake mechanisms 32b and 32c are mounted, typically with fasteners such as bolts and the like, but which can be welded within channel 40. Rollers 30b and 30c to which the brake mechanisms 32b and 32c are associated include respective axles 42b and 42c. Each brake mechanism 32b, 32c includes a brake drum or rotor 44b, 44c that is fixedly attached to the respective axle 42b, 42c. The brake drums 44b, 44c thus rotate with the respective roller 30b, 30c as the brake drums are essentially integral with the roller.

Referring to FIGS. 3 and 4 an enlarged brake mechanism 32 is shown. It should be understood that the embodiment of the brake mechanism 32 shown in FIGS. 3 and 4 and described below is not intended to limit the type of brake mechanisms that can be utilized in order to implement the present invention. Also, for clarity, the numerical designation of the components of the brake mechanism 32 depicted in FIGS. 3 and 4 corresponds to the alphanumeric designation of components of the plurality of brake mechanisms depicted in FIGS. 1 and 2. This is due to the fact that the components described with reference to FIGS. 3 and 4 are identical to the components depicted in FIGS. 1 and 2.

Partially radially surrounding the periphery 45 of brake drum 44 and spaced a small distance therefrom, are two brake pads 47 and 49 of a typical brake pad material that are respectively supported by rigid brake pad holders or plates 46 and 48. Both the brake pads 47, 49 and the brake pad holders 46, 48 are curved at the same rate of curvature as the periphery 45 of brake drum 44 such that when brake pads 47, 49 are caused to move into contact with the periphery 45 of brake drum 44, the entire respective radially inside surfaces of brake pads 47, 49 make abutting contact with brake drum 44.

Brake mechanism 32 includes a base plate 78 that is secured to channel 40 of rail 26 via bolts 80, 81. An actuator mount 58 is attached to base plate 78 via bolt 60. Actuator mount 58 supports an actuator or piston mechanism 50. Actuator 50 provides the mechanical actuation necessary to move brake pad holders 46, 48, and thus brake pads 47, 49 into engagement with brake drum 44 in response to an actuator signal. In the embodiment of the brake mechanism 32 depicted in FIGS. 3 and 4, actuator 50 is a dual arm actuator, however it should be understood that a single arm actuator may be utilized with some modification to the overall brake mechanism. Actuator 50 can be a hydraulic, pneumatic, mechanical, or electric type actuator, and depending on the type of actuator used, the master control line 34 and connecting control line 36 (see FIG. 1) contains the necessary hydraulic lines, pneumatic lines, mechanical linkage, or electric lines, in order to provide an actuation signal thereto from the control unit 38.

Actuator 50 has two arms or piston extensions 62 and 64 that are axially movable in response to the actuation signal provided by control unit 38 and transmitted via master line 34 and connecting line 36. Brake mechanism 32 is shown in its normal state wherein the brake drum 44 and respective roller is free to rotate. Brake pads 47, 49 are thus radially spaced from brake drum 44. Arm 62 is fixedly attached to actuator plate 66 that includes a coupling 68 secured to the side opposite to arm 62. Brake pad holder 46 is releasably secured to coupling 68 such that the associated brake pad may be changed should it wear out. Arm 64 is fixedly attached to return plate 54 that is coupled to back plate 56. Attached between actuator plate 66 and return plate 54 is a spring 52. Spring 52 normally biases plates 66 and 54 towards each other assisting rods 62, 64. This helps to keep brake pads 47, 49 in the first state or position, spaced from the periphery 45 of brake drum 44. Back plate 56 is movable with respect to rail 26 and extends along channel 40 behind brake drum 44. Secured to the end of back plate 56 opposite return plate 54 is actuator plate 70. Secured to actuator plate 70 is a coupling 72 that releasably carries brake pad plate 48. An elongated opening 76 is disposed in back plate 56 through which is disposed a bolt that is attached to rail 26. Opening 76 allows back plate 56 to limitedly move in response to movement of arm 64.

With particular reference still to FIGS. 3 and 4, the operation of the brake mechanism 32 will now be described. In its normal state, brake mechanism 32 is as shown in FIG. 3, wherein brake drum 44 and the respective roller to which it is attached may freely revolve. Brake pads 47, 49 are spaced a distance from the periphery 45 of brake drum 44. When actuator 50 receives an appropriate signal from the control unit 38 via line 36 arms 62 and 64 are axially extended outwardly. Arm 62 causes brake pad holder 46 and thus brake pad 47 to move radially inwardly towards the periphery 45 of brake drum 44 via actuator plate 66 and coupling 68. At the same time, arm 64 presses against return plate 54 which in turn moves back plate 56 in a direction opposite to the movement of arm 62. Since brake pad 49 is coupled to back plate 56 through brake pad holder 48, coupling 72, and actuator plate 70, brake pad 49 is caused to move radially inwardly towards the periphery 45 of the brake drum 44. Also, during actuation, spring 52 stretches between plates 54 and 66.

In the above manner, brake pads 47 and 49 are thus caused to be pressed against brake drum 44 thereby effecting retarding of the motion of brake drum 44 and consequently the respective roller associated therewith. A release signal generated by the control unit 38 and transmitted via master line 34 and connecting line 36 causes the brake pads to return to their normal state. Spring 52 assists in returning plates 54, 66 back to the rest position. Depending on the length of time that the brake pads 47, 49 are held against the brake drum 44, the rotational velocity of the roller may be somewhat slowed down or completely stopped.

The control unit 38 may create a pulsed signal or a steady signal depending on the desired result. Also, in accordance with the present invention, the control unit 38 may be coupled to a group of brake mechanisms that would be simultaneously actuated by the actuation signal. Alternatively, the control unit may be coupled to several groups of brake mechanisms such that separate signals would control the various groups. The various groups could act in unison or may be separately actuated to provided a controlled unloading of the cargo.

Figure 5:
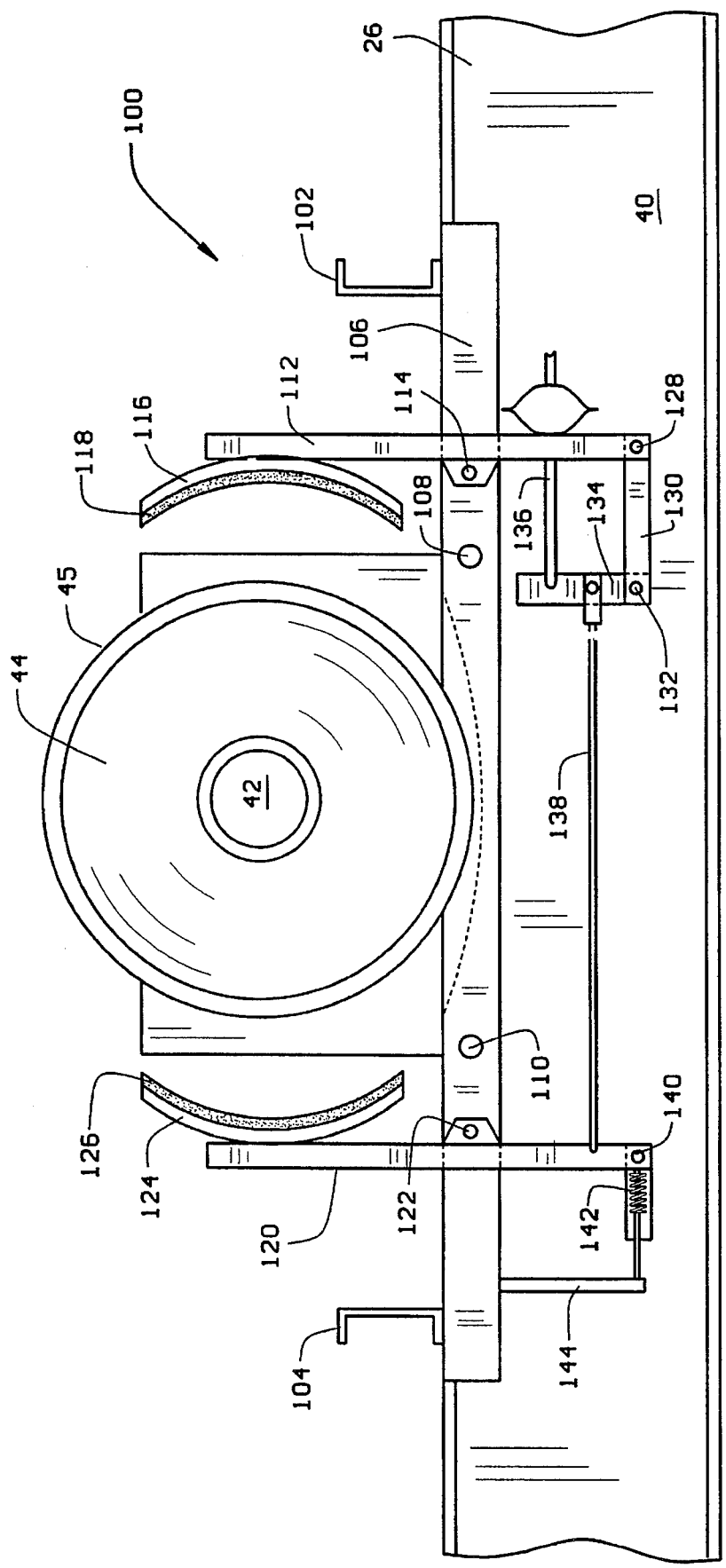
FIG. 5 is an enlarged front view of an alternative embodiment of a brake mechanism.

An alternative embodiment of a brake mechanism that can be utilized in the present invention is shown in FIG. 5 and is generally designated 100. Brake mechanism 100 is mounted to rail 26 between trailer cross-members 102 and 104 by a mounting bar 106 and associated bolts 108 and 110. Disposed transverse to mounting bar 106 on one side of brake drum 45 is a brake arm 112. Brake arm 112 is pivotally mounted at 114 to mounting bar 106 and carries at one end a curved brake pad plate 116 with a brake pad 118. Disposed transverse to mounting bar 106 on the other side of brake drum 45 diametrically opposite brake arm 112 is a brake arm 120. Brake arm 120 is pivotally mounted at 122 to mounting bar 106 and carries at one end a curved brake pad plate 124 with a brake pad 126. Brake pads 118 and 126 are designed to abut the periphery 45 of brake drum 44 when actuated.

At the end of brake arm 112 distal brake pad plate 116 is a pivoting connection 128 with a cross-bar 130. Cross-bar 130 extends therefrom a short distance and is pivotally coupled at 132 to member 134. Member 134 is attached to an actuating rod 136 that is coupled to an actuator (not shown) for providing the mechanical force necessary to bring the brake pads 118 and 124 against brake drum 44. An extension rod 138 is coupled to member 134 between pivot 132 and actuating rod 136. Extension rod 138 is attached at the other end to brake arm 120 in order to actuate the same. A return spring 142 has one end fixedly attached at 140 to brake arm 120 and the other end to member 144.

Operation of brake mechanism 100 is as follows. An actuating signal is received by the actuator (not shown) from the control unit (not shown). The actuator pushes on actuator rod 136 which causes the top portion of member 134 to limitedly pivot about pivot 132. At the same time cross-member 130 is caused to move opposite to actuator rod 136. The movement of cross-member 130 causes brake arm 112 to pivot about 114 bringing brake pad 118 into contact with the periphery 45 of the brake drum 44. Also, extension rod 138 is caused to concurrently move in the direction of actuator rod 136 as member 134 is pushed forward. Extension rod 138 causes brake arm 120 to pivot about pivot 122 to cause brake pad 126 to engage the periphery 45 of the brake drum 44.

When actuator rod 136 is released or pulled back to its normal state, return spring 142 assists in returning the brake mechanism to its normal state.

While the foregoing is directed to the preferred embodiment of the present invention, other and further embodiments of the invention may be devised without departing from the basic scope thereof, and the scope thereof is determined by the claims which follow.

What is claimed is:

1. An apparatus for controlling the unloading of cargo from a truck trailer, the apparatus comprising:

a plurality of elongate rollers each having an integral shaft defining an axis of rotation, and rotatably coupled to the trailer by said shafts such that said axis of rotation is transverse to the longitudinal length of the trailer, said plurality of rollers substantially extending the transverse length of the trailer;

a control unit adapted to provide an actuation signal; and a brake mechanism coupled to selected shafts of said plurality of rollers, each said brake mechanism including a brake actuator in communication with said control unit and adapted to receive said actuation signal, said brake mechanism operable to retard rotational movement of said roller when said brake mechanism is actuated by said brake actuator in response to said actuation signal, said brake mechanism further including a brake drum coupled to one end of said shaft so as to rotate with said roller, and a first brake pad at least partially radially surrounding said brake drum, said first brake pad normally biased into a first position wherein said first brake pad is radially spaced from said brake drum such that said brake drum and said roller are freely rotatable, said first brake pad actuatable by said brake actuator into a second position in response to said actuation signal such that said first brake pad radially engages said brake drum causing said roller to be rotationally retarded by friction.

2. The cargo controlling apparatus of claim 1, further comprising a second brake pad at least partially radially surrounding said brake drum, said second brake pad normally biased into a first position wherein said second brake pad is radially spaced from said brake drum such that said brake drum and said roller are freely rotatable and actuatable into a second position in response to said actuation such that said second brake pad radially engages said brake drum causing said roller to be rotationally retarded by friction.

3. In a cargo controlling apparatus for a roll-off trailer, the roll-off trailer characteristically having a plurality of rotatable rollers each having an integral shaft defining an axis of rotation disposed transverse to the longitudinal length of the roll-off trailer and extending substantially the transverse length thereof, the improvement comprising:

a control unit providing a plurality of separate actuation signals in response to input from an operator; and a brake mechanism coupled to each said shaft of a predetermined number of said plurality of rollers, said brake mechanisms each including a brake drum coupled to an end of said shaft for rotation therewith, a pair of brake pads each of which at least partially radially surrounds said brake drum, and a brake actuator coupled to said pair of brake pads and in communication with said control unit in order to receive one of said plurality of separate actuation signals, said pair of brake pads normally maintained in a first state wherein said pair of brake pads are spaced from said brake drum allowing the roller and said brake drum to freely rotate, said pair of brake pads actuatable into a second state by said brake actuator in response to receipt of one of said plurality of separate actuation signals, said second state causing said pair of brake pads to radially engage said brake drum to frictionally retard rotational velocity of said brake drum and the respective roller.

4. The cargo controlling apparatus of claim 3, wherein each of said brake mechanisms are independently actuatable by one of said plurality of separate actuation signals.

5. The cargo controlling apparatus of claim 4, wherein said brake mechanisms are formed into groups, said brake mechanisms in each of said groups being simultaneously actuated by one of said plurality of actuation signals.

6. The cargo controlling apparatus of claim 3, wherein said brake actuator is pneumatic, and said control unit provides a pneumatic actuation signal.

7. The cargo controlling apparatus of claim 3, wherein said brake actuator is electric, and said control unit provides an electric actuation signal.

8. The cargo controlling apparatus of claim 3, wherein said brake actuator is hydraulic, and said control unit provides a hydraulic actuation signal.

9. The cargo controlling apparatus of claim 3, wherein said brake actuator is mechanical, and said control unit provides a mechanical actuation signal.

10. A truck trailer for transporting trusses, the trailer comprising:

a longitudinal bed;

a plurality of rollers having an integral shaft defining an axis of rotation and rotatably disposed on an upper surface of said bed, each of said rollers extending substantially the entire transverse length of the longitudinal length of said bed such that said axis of rotation is transverse to the longitudinal length of said bed;

a control unit providing an actuation signal upon input from an operator;

a brake mechanism coupled to each one of a predetermined number of said plurality of rollers, each one of said brake mechanisms including a brake rotor coupled to a respective shaft of said predetermined number of said plurality of rollers so as to rotate therewith, a brake pad radially adjacent said brake rotor, a brake pad actuator operably coupled to said brake pad and in communication with said control unit so as to receive said actuation signal, said brake pad normally biased into a first state wherein said brake pad is radially spaced from said brake rotor allowing said brake rotor and said roller to freely rotate, said brake pad actuatable into a second state by action of said brake pad actuator upon receipt of said actuation signal from said control unit wherein said brake pad frictionally engages said brake rotor to retard rotation of said roller, said brake pad returning to said first state upon cessation of said actuation signal to allow rotation of said roller.

11. The trailer of claim 10, wherein said predetermined number of said plurality of rollers equals said plurality of rollers.

* * * * *